US008889582B2

(12) United States Patent
Noguchi et al.

(10) Patent No.: US 8,889,582 B2
(45) Date of Patent: Nov. 18, 2014

(54) HYDROGEN COMBUSTION CATALYST AND METHOD FOR PRODUCING THEREOF, AND METHOD FOR COMBUSTING HYDROGEN

(75) Inventors: Hirosi Noguchi, Tsukuba (JP); Junichi Taniuchi, Tsukuba (JP); Hitoshi Kubo, Tsukuba (JP); Yasunori Iwai, Ibaraki (JP); Katsumi Sato, Ibaraki (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 28 days.

(21) Appl. No.: 13/518,976

(22) PCT Filed: Jan. 7, 2011

(86) PCT No.: PCT/JP2011/050150
§ 371 (c)(1),
(2), (4) Date: Jun. 25, 2012

(87) PCT Pub. No.: WO2011/083833
PCT Pub. Date: Jul. 14, 2011

(65) Prior Publication Data
US 2012/0263636 A1  Oct. 18, 2012

(30) Foreign Application Priority Data

Jan. 7, 2010  (JP) .................... 2010-002025

(51) Int. Cl.
| | |
|---|---|
| B01J 23/42 | (2006.01) |
| B01J 21/08 | (2006.01) |
| B01J 37/02 | (2006.01) |
| B01J 33/00 | (2006.01) |
| C01B 5/00 | (2006.01) |
| B01J 31/02 | (2006.01) |
| G21B 1/11 | (2006.01) |

(52) U.S. Cl.
CPC ............... *G21B 1/115* (2013.01); *B01J 21/08* (2013.01); *B01J 37/0203* (2013.01); *B01J 23/42* (2013.01); *B01J 33/00* (2013.01); *C01B 5/00* (2013.01); *B01J 31/0274* (2013.01); *B01J 37/0209* (2013.01); *B01J 37/0207* (2013.01)
USPC ........................................................ 502/158

(58) Field of Classification Search
None
See application file for complete search history.

(56) References Cited

U.S. PATENT DOCUMENTS

| 4,178,350 A | 12/1979 | Collins et al. ................. 423/248 |
| 4,196,176 A * | 4/1980 | Galloway ....................... 423/248 |

(Continued)

FOREIGN PATENT DOCUMENTS

| JP | 36-015014 | 9/1961 |
| JP | 48-016888 | 3/1973 |

(Continued)

OTHER PUBLICATIONS

"Fusion Reactor Technology." Edited by Masahiro Seki, Published by Nikkan Kogyo Shimbun, Ltd. Japanese Article + Partial Translation of Section 15.3.2. , p. 227.

*Primary Examiner* — Melissa Swain
(74) *Attorney, Agent, or Firm* — Roberts & Roberts, LLP

(57) ABSTRACT

The present invention is a hydrogen combustion catalyst including a catalyst metal supported on a carrier composed of an inorganic oxide, wherein a functional group having at the end thereof at least an alkyl group having three or less carbon atoms is bonded by substitution to each of a certain fraction or the whole of the hydroxyl groups on the surface of the carrier. The functional group bonded to each of a certain fraction or the whole of the hydroxyl groups on the surface of the carrier is preferably an organic silane. The hydrogen combustion catalyst according to the present invention is capable of maintaining the activity thereof even when a hydrogen-containing gas, a treatment object, contains a water content equal to or less than the saturated water vapor content and the reaction temperature is set at or around room temperature, namely, at 0 to 40° C.

3 Claims, 2 Drawing Sheets

(56) References Cited

U.S. PATENT DOCUMENTS

| | | | |
|---|---|---|---|
| 4,470,955 A | | 9/1984 | Collins et al. ............... 422/159 |
| 4,816,237 A | * | 3/1989 | Tomomura et al. ........... 423/210 |
| 2005/0281735 A1 | * | 12/2005 | Chellappa et al. ......... 423/648.1 |

FOREIGN PATENT DOCUMENTS

| | | | |
|---|---|---|---|
| JP | 50-053799 | | 5/1975 |
| JP | 56-089845 | | 7/1981 |
| JP | 60-087857 | | 5/1985 |
| JP | 62-247294 | | 10/1987 |
| JP | 05-038432 | | 2/1993 |
| JP | 2002113368 A | * | 4/2002 |
| JP | 2006-026605 | | 2/2006 |
| WO | WO 2007059974 A1 | * | 5/2007 |

* cited by examiner

HYDROGEN COMBUSTION CATALYST AND METHOD FOR PRODUCING THEREOF, AND METHOD FOR COMBUSTING HYDROGEN

TECHNICAL FIELD

The present invention relates to a catalyst for combustion of hydrogen (inclusive of isotopes) in an air-containing gas. In particular, the present invention provides a hydrogen combustion catalyst hardly susceptible to water mist and water vapor in the atmosphere and water produced by the hydrogen combustion and capable of maintaining the activity thereof even at relatively low temperatures.

BACKGROUND ART

A nuclear fusion plant using as fuel deuterium (D) and tritium (T) requires a tritium removal facility that treats the exhaust gas from the building facility in which a nuclear fusion reactor and the like are placed. This is because the tritium contained in the exhaust gas is a radioactive substance, and hence even a slightest amount of the tritium is not allowed to be discharged to the outside of the facility. In the tritium removal facility, the exhaust gas from the building facility is made to pass through a catalyst layer, thus the tritium-containing hydrogen is combusted into water, the resulting water component is removed and collected, and thus an exhaust gas in a clean condition is discharged.

PRIOR ART DOCUMENT

Non Patent Literature

Non Patent Literature 1: Introduction to Nuclear Fusion Reactor Engineering (Kaku-Yugou-Ro Kougaku Gairon in Japanese), September 2001, Masahiro Seki (ed.), published by Nikkan Kogyo Shimbun, Ltd.

As the catalyst for removal of the tritium, hitherto known hydrogen combustion catalysts have been used because tritium is a hydrogen isotope and is capable of being combusted similarly to hydrogen. Such hydrogen combustion catalysts are generally those catalysts which are prepared by making catalyst metals such as platinum be supported on pellet-shaped carriers composed of metal oxides such as silica and alumina. However, in these carriers, a water film covers platinum having activity, and thus the diffusion of hydrogen to platinum is inhibited; accordingly, these carriers suffer from a problem that the catalysts are deactivated.

In the tritium removal facility, the treatment-object gas is heated to about 200° C. and then made to pass through the catalyst layer. This is based on a general knowledge that the activity of the catalyst is high when the reaction temperature is high, and at the same time, this is for the purpose of suppressing the hydrogen diffusion inhibition due to the water vapor produced by the hydrogen combustion and the water vapor originally contained in the gas being treated. In other words, these water components adsorbe to the metal oxide, the carrier, and such adsorbed water offers a factor to decrease the activity of the catalyst. Accordingly, the reaction temperature is required to be made high for the purpose of discharging the produced water by evaporating the produced water instantly at the time of its production to the outside of the catalyst.

The aforementioned heating of the exhaust gas for the hydrogen combustion is essential for maintaining the reaction progress of the hydrogen combustion; however, as the matter now stands, from the viewpoint of maintaining the safety of the nuclear fusion plant, it is preferable to avoid the high temperature of the catalytic oxidation reactor regarded as an important facility for the purpose of ensuring the safety of the nuclear fusion plant.

DISCLOSURE OF THE INVENTION

Problems to be Solved by the Invention

Continuation of the reaction at low temperatures is sometimes required for the hydrogen combustion catalysts used in plants such as a high-purity hydrogen purification plant, in addition to the aforementioned nuclear fusion plant. However, the reaction at low temperatures results in the occurrence of the activity decrease due to the adsorption of the produced water. Accordingly, the present invention provides a hydrogen combustion catalyst requiring no consideration of the effects of the water content in the atmosphere and the produced water due to the combustion reaction, and being capable of maintaining the reaction at low temperatures.

Means for Solving the Problems

The present invention solving the aforementioned problem is a hydrogen combustion catalyst including a catalyst metal supported on a carrier composed of an inorganic oxide, wherein a functional group having at the end thereof at least an alkyl group having three or less carbon atoms is bonded by substitution to each of a certain fraction or the whole of the hydroxyl groups on the surface of the carrier.

The conventional catalysts are not low in the activities of themselves, and each have a capability of combusting hydrogen even when the reaction temperature is not made high. As described above, the requirement of heating is for the purpose of preventing the water content from being absorbed to the carrier. Accordingly, in solving the aforementioned problem, the suppression of the adsorption of water to the carrier can be said a preferable technique.

In this connection, examples of a possible method for suppressing the water adsorption include: a counter measure in which the carrier itself is altered to a hydrophobic substance such as a resin, and a countermeasure in which a hydrophobic coating film is formed on the carrier. However, carriers made of resins unfortunately suffer from the risk of ignition and from the durability when local heating occurs due to the reaction heat in the catalyst layer, and also suffer from the radiation damage due to radioactive substances such as tritium. On the other hand, the coating film formation unfortunately suffers from the difficulty in forming the coating film while the porousness of the metal oxide carrier is being maintained.

Accordingly, the present inventors studied the hydrophobization of the carrier by the surface treatment thereof wherein the carrier is the conventional metal oxides such as silica and alumina. Specifically, the metal oxides such as silica and alumina have hydroxyl groups present on the surface thereof, and the present inventors have perfected the present invention by discovering that the carries are made hydrophobic by modifying these hydroxyl groups with predetermined functional groups.

The modification treatment for hydrophobization in the present invention is the substitution of a functional group having an alkyl group in the hydrogen moiety of each of a certain fraction or the whole of the hydroxyl groups (OH) on the surface of the metal oxide. The functional group modifying each of a certain fraction or the whole of the hydroxyl groups has at the end thereof at least an alkyl group. The end of each of a certain fraction or the whole of the hydroxyl groups on the surface of the carrier is transformed into an alkyl group because such an alkyl group is excellent in the effect of reducing the polarity of the surface of the carrier and enables a rapid discharge of water molecules without allowing water molecules to be adsorbed to the carrier. The number of the carbon atoms in the alkyl group is required to be three or less (a methyl group, an ethyl group or a propyl group). According to the present inventors, the number the carbon atoms of the alkyl group affect the heat resistance of the hydrophobization effect of the catalyst. Thus, the carrier modified with an alkyl group (such as a butyl group) having more than three carbon atoms tends to lose the hydrophobicity at high temperatures, to thereby result in the water content adsorption and the deactivation of the catalyst. The aforementioned heat resistance offers no direct problem in the present invention premised on the low temperature reaction; however, such a problem of the heat resistance should be avoided because when a local temperature increase due to the reaction heat occurs in the catalyst layer, the nonuniformity of the reaction is caused. The number of the alkyl groups belonging to the functional group may be at least one, or alternatively the functional group may have a plurality of alkyl groups.

The functional group modifying the hydroxyl group is preferably an organic silane having one or more alkyl groups. This is because such an organic silane, as a functional group having one or more alkyl groups, has a variety of forms and a satisfactory reactivity with the hydroxyl group. Examples of such an organic silane are described in the following production method.

The catalyst carrier according to the present invention is a metal oxide, and is preferably alumina, silica, silica-alumina, zeolite or zirconia. These metal oxides have hitherto been used as catalyst carriers, and are excellent in porousness and heat resistance. The shapes of the carriers are not particularly limited. The carriers are generally molded in cylindrical pellet shapes or spherical pellet shapes; besides these, carriers may also be prepared by coating appropriate supports such as honeycombs and networks with these metal oxides and by applying hydrophobization treatment to the resulting coating layers.

The catalyst metal supported on the carrier is preferably a precious metal, and among others, platinum, palladium or an alloy of platinum or palladium is suitable for the hydrogen combustion catalyst. According to the below described carrying method, the catalyst metal takes a form of an atomic metal formed by adsorbing a metal salt solution to the carrier and by reducing the adsorbate, or a form of a colloidal (cluster-like) metal formed by adsorbing to the carrier a metal colloid solution prepared beforehand; any of these forms are acceptable. Because of these forms, the particle size of the catalyst metal is 1 to 100 nm. The loading (loading rate) of the catalyst metal is also not particularly limited; in general, the loading is set at 0.1 to 10% by weight in relation to the carrier weight.

The preferable physical properties of the catalyst according to the present invention are as follows: preferably the specific surface area is 100 to 300 $m^2/g$, the average pore size is 100 to 300 nm, and the pore volume is 0.3 to 1.0 mL/g.

The above-described method for producing the hydrogen combustion catalyst according to the present invention includes: a step of performing a hydrophobization treatment of bonding the functional group through substitution to each of a certain fraction or the whole of the hydroxyl groups on the surface of the carrier by immersing the inorganic oxide to be the carrier in a solution of a compound of the functional group having at the end thereof one or more alkyl groups each having three or less carbon atoms; and a step of subsequently making the carrier carry the catalyst metal.

The hydrophobization treatment of the carrier is an adsorption of the solution of the compound containing the functional group modifying each of a certain fraction or the whole of the hydroxyl groups on the surface of the inorganic oxide. The compound for the hydrophobization treatment is preferably an inorganic silane surface modifier. As the inorganic silane surface modifier having at the end thereof one or more alkyl groups, any one of the following is preferable: trimethylmethoxysilane, trimethylethoxysilane, trimethylchlorosilane, dimethyldimethoxysilane, dimethyldiethoxysilane, dimethyldichlorosilane, methyltrimethoxysilane, methyltriethoxysilane, methyltrichlorosilane, triethylmethoxysilane, triethylethoxysilane, triethylchlorosilane, diethyldimethoxysilane, diethyldiethoxysilane, diethyldichlorosilane, ethyltrimethoxysilane, ethyltriethoxysilane, ethyltrichlorosilane, tripropylmethoxysilane, tripropylethoxysilane, tripropylchlorosilane, dipropyldimethoxysilane, dipropyldiethoxysilane, dipropyldichlorosilane, propyltrimethoxysilane, propyltriethoxysilane and propyltrichlorosilane. The compounds having a propyl group include the branched compounds as well as the linear compounds.

Specifically, in the method for hydrophobization treatment of the carrier, the carrier is immersed in a solution prepared by dissolving the aforementioned compound in a solvent. In this immersion, the hydrogen of each of a certain fraction or the whole of the hydroxyl groups on the surface of the carrier is substituted with a hydrophobic functional group. Subsequently, the carrier is taken out of the solution, and appropriately washed and dried. In the catalyst according to the present invention, the hydroxyl groups on the surface of the carrier preferably wholly undergo such substitution. The amount of the compound mixed in the solution can be calculated from the coverage area ($m^2/g$) specified for each of the compounds, and the weight (g) and the specific surface area ($m^2/g$) of the carrier ((weight of carrier×specific surface area of carrier)/coverage area of compound); at an approximate estimation, 1.0 to 100 g of the compound is used for 100 g of the carrier. Preferably, the volume of the solution (solvent) is approximately such that allows the carrier to be wholly immersed.

The carrying of the catalyst metal on the carrier subjected to the hydrophobization treatment is the same as in conventional catalysts. As the method for carrying of the catalyst metal, there is a conventionally available method in which a carrier is immersed in a solution of a metal salt, and then the atomic metal is supported by addition of a reducing agent or by heat treatment. In such a case, the metal salts used for platinum are platinum salts such as dinitrodiammine platinum and chloroplatinic acid, and the metal salts used for palladium are palladium salts such as dinitrodiammine palladium and palladium chloride.

As the method for carrying the catalyst metal, there is available another method in which a metal colloid is supported on the carrier. A metal colloid is prepared by adding to a solvent a metal salt and, if necessary, an organic compound to be a protective agent to the solvent, and by adding a reducing agent to the resulting solution. In the case of supporting a colloid on the carrier, the catalyst can be prepared as follows: the carrier is brought into contact with the solution following the colloid preparation or with the solution prepared by again dispersing in a solvent the metal colloid obtained by once filtering the solution following the colloid preparation; thus the metal colloid particles are adsorbed to the carrier; and then the carrier is appropriately washed and heat treated to prepare the catalyst.

As described above, the hydrogen combustion catalyst according to the present invention does not need the heating to suppress the adsorption of the produced water due to the hydrogen combustion reaction and the water present in the atmosphere, and allows the hydrogen combustion reaction to be continued at relatively low temperatures. In the method for combusting, by using this hydrogen combustion catalyst, the hydrogen in the hydrogen-containing gas, the combustion method is effective even for the hydrogen-containing gas, to be the treatment object, containing a water content equal to the saturated water vapor content at the reaction temperature of the hydrogen-containing gas, and moreover, allows the reaction temperature to be set at room temperature, specifically, at 0 to 40° C.

Advantageous Effects of Invention

As described above, the hydrogen combustion catalyst according to the present invention enables, through the hydrophobicity provided to the carrier, to suppress the adsorption, to the carrier, of the produced water due to the hydrogen combustion or the water content in the gas being treated. Consequently, without raising the temperature of the catalyst layer high, the catalytic activity can be maintained. At the same time, the hydrogen combustion catalyst according to the present invention is water-repellent and hence is provided with resistance to the degradation due to water staining, such as staining with liquid water from a sprinkler in the case of fire at the time of emergency.

The hydrogen combustion catalyst according to the present invention is applicable to various types of apparatuses for combusting hydrogen, and is suitable for the catalytic oxidation reactor transforming through oxidation the tritium in the exhaust gas from the tritium utilization facility into water, because of the aforementioned advantages.

DETAILED DESCRIPTION OF THE PREFERRED EMBODIMENTS

Figure 1:
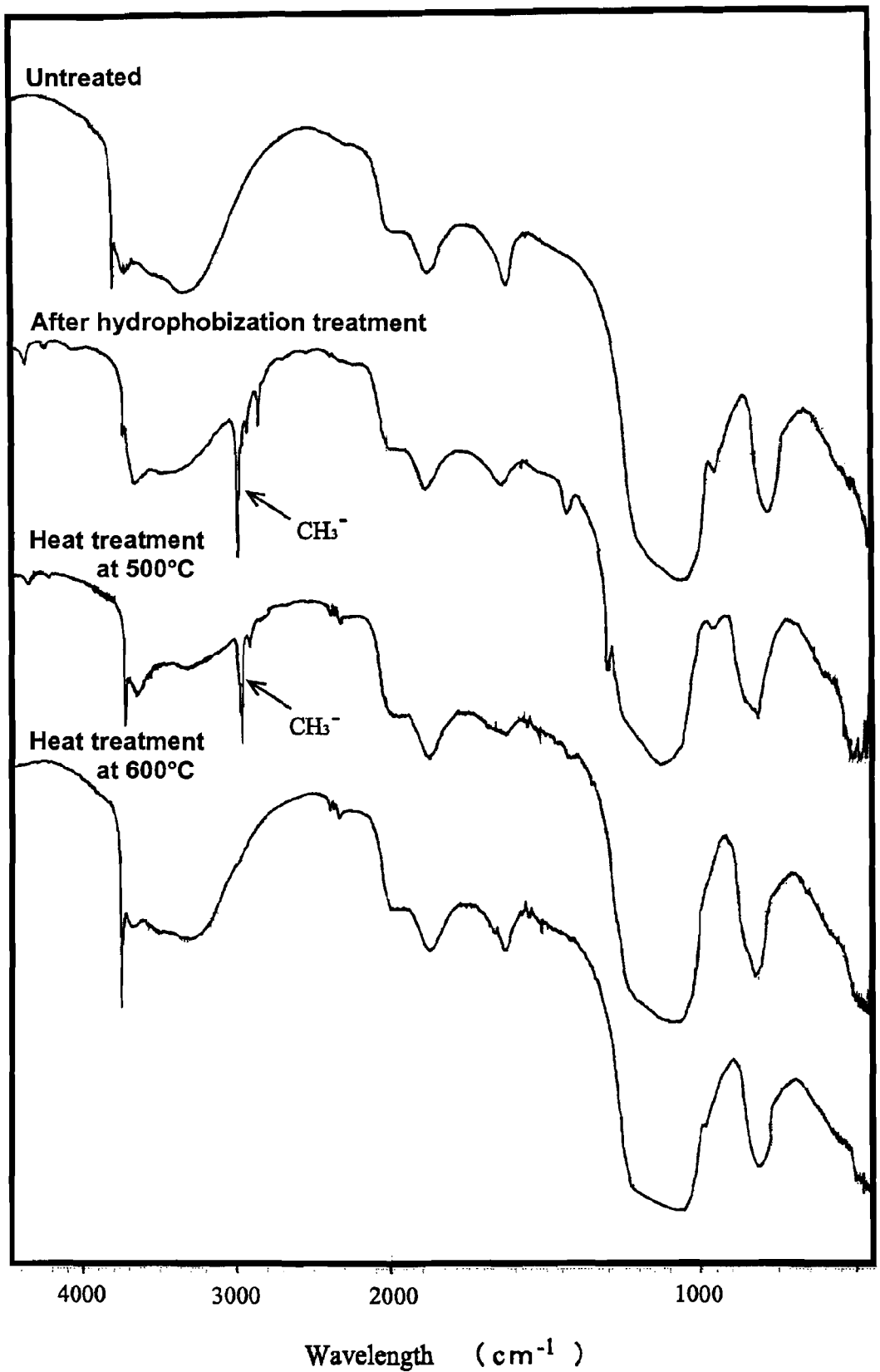
FIG. 1 shows the results of the infrared-spectroscopic analysis of the silica carriers untreated and subjected to hydrophobization treatment.

Hereinafter, the best mode for carrying out the present invention is described. In the present embodiment, for each of the various carriers, after the hydrophobization treatment, the effect of the hydrophobization was verified, and the catalyst metal was supported on the hydrophobized carrier to prepare a catalyst, and the effect of the hydrogen combustion and the effect of the tritium combustion were verified with the catalyst.

[Hydrophobization Treatment of Carrier and Verification of Effect of Hydrophobization Treatment]

First, as a carrier, 100 g of a silica carrier (specific surface area: 230 $m^2/g$) was prepared and subjected to a hydrophobization treatment. The hydrophobization treatment was performed as follows: a mixed solution prepared by uniformly dissolving 40 g of methyltrimethoxysilane, 50 g of purified water and 50 g of ethanol was added to the silica carrier and the resulting mixture was shaken and stirred for hydrophobization. After one day elapsed, the carrier was taken out, washed with purified water, and then dried at 200° C. Before the treatment, the carrier was washed with purified water, and the carrier was immersed for 24 hours in the ethanol solutions (concentration: 15% by weight) of different inorganic silane surface modifiers. Subsequently, the carrier was taken out from each of the ethanol solutions, washed with purified water, and dried at 200° C. The weight increase of each carrier due to the silane treatment was about 13%.

In such hydrophobization treatments for the silica carrier, the same treatment as for methyltrimethoxysilane was performed by using each of the following inorganic silane surface modifiers other than aforementioned methyltrimethoxysilane: dimethyldimethoxysilane, n-propyltrimethoxysilane, n-butyltrimethoxysilane and n-hexyltrimethoxysilane.

For the silica carriers subjected to the hydrophobization treatment with the aforementioned various inorganic silane surface modifiers, the effects of the hydrophobization were verified. The evaluation tests were performed as follows: the case where a carrier placed in a water vessel emerged was determined that the hydrophobization effect was verified; the case where a carrier placed in a water vessel submerged was determined that water adsorbed to the carrier. The evaluation test was also performed for each of the carriers heat treated at 200° C., 300° C., 400° C., 500° C. and 600° C., in addition to the carriers after the hydrophobization treatment. The results of the tests are shown in Table 1.

TABLE 1

| Inorganic silane surface modifier | Heat treatment | | | | | |
|---|---|---|---|---|---|---|
| | None | 200° C. | 300° C. | 400° C. | 500° C. | 600° C. |
| Methyltri-methoxysilane | o | o | o | o | o | o |
| Dimethyldi-methoxysilane | o | o | o | o | o | x |
| n-Propyltri-methoxysilane | o | o | o | x | x | x |
| n-Butyltri-methoxysilane | o | o | x | x | x | x |
| n-Hexyltri-methoxysilane | o | o | x | x | x | x | o: Emerged in water vessel (hydrophobization effect was found)
x: Submerged in water vessel (hydrophobization effect was lost)

From Table 1, the hydrophobization effect of each inorganic silane surface modifier is verified; however, as can be seen from Table 1, in the cases where the carriers were heated, when the number of the carbon atoms in the bonded alkyl group was four (as in butyl) or more, the heating at 300° C. or higher vanished the hydrophobization effect. Consequently, in consideration of the possibility of the local elevation of the reaction temperature, it can be stated that the number of the carbon atoms in the alkyl group is preferably set at three or less.

Next, the presence of the alkyl group on the surface of the carrier was examined for the silica carriers subjected to the hydrophobization treatment. In this test, an untreated silica carrier, and silica carriers treated with dimethyldimethoxysilane but not heat treated, and silica carriers treated with dimethyldimethoxysilane and heat treated at 500° C. and 600° C., respectively were analyzed with infrared (IR) spectroscopic analysis. The results thus obtained are shown in FIG. 1; the silica carriers treated with dimethyldimethoxysilane (one not heat treated and one heat treated at 500° C., respectively) each exhibited a peak showing a methyl group. In the aforementioned test for verifying the hydrophobization effect, the carriers heat treated at 500° C. emerged above water; in contrast to this, the carriers heat treated at 600° C. submerged in water;

in these analysis results, the carriers heat treated at 600° C. lost the methyl group peak, in accordance with the aforementioned evaluation results.

[Production and Evaluation of Hydrogen Combustion Catalyst]

A catalyst was produced by using a silica carrier treated with methyltrimethoxysilane, which was proven to be excellent in hydrophobization effect in the aforementioned test, and the performances of the resulting catalyst were evaluated. Here, another catalyst was also produced by using an alumina carrier subjected to hydrophobization treatment with methyltrimethoxysilane. Table 2 shows the physical properties before and after the hydrophobization treatment for each carrier.

TABLE 2

| Carrier | Hydrophobization treatment | Specific Surface area ($m^2/g$) | Pore size (nm) | Pore volume (mL/g) |
|---|---|---|---|---|
| $SiO_2$ | None | 240 | 16.6 | 0.998 |
|  | Performed | 211 | 12.3 | 0.648 |
| $Al_2O_3$ | None | 160 | 15.2 | 0.607 |
|  | Performed | 143 | 16.1 | 0.574 |

In the production of the catalysts, to each (100 g) of the carriers, a solution prepared by diluting, in 100 g of ethanol, 25 g of a 5% ethanol solution of chloroplatinic acid was added to be impregnated into the carrier. Next, the ethanol was evaporated with a rotary evaporator, then the carrier was placed in a column, 3% hydrogen gas (balanced with $N_2$) was made to pass through the column at 300° C. for 2 hours for the purpose of reduction, and thus a catalyst was obtained. The platinum concentration of each of the thus produced catalysts was 1.0% by weight.

(Water Absorption Test)

For the purpose of verifying the hydrophobization effect of each catalyst produced as described above, each catalyst was pulverized, placed in a desiccator containing water, and allowed to stand still at normal temperature for a sufficient period of time until the equilibrium water adsorption was attained, and then the adsorption amount of water was measured. The measurement of the adsorption amount was performed for each of the catalyst powders on the basis of thermogravimetry-differential thermal analysis (TG-DTA). The adsorption amount was also measured for the catalysts produced from the carriers not subjected to the hydrophobization treatment. The results thus obtained are shown in Table 3.

TABLE 3

| | Catalyst constitution | Hydrophobization treatment | Water absorption rate |
|---|---|---|---|
| Example 1 | $Pt/SiO_2$ | Performed | 0.7% |
| Comparative Example 1 |  | None | 33.9% |
| Example 3 | $Pt/Al_2O_3$ | Performed | 1.8% |
| Comparative Example 2 |  | None | 24.3% |

As can be seen from Table 3, in the case where no hydrophobization treatment was performed, a water adsorption of 20% or more was found for both of silica and alumina. In each catalyst according to Examples, the adsorption amount was remarkably reduced, and the hydrophobization treatment effect was verified to be maintained even after the production of the catalyst.

(Hydrogen Combustion Test)

Next, the performance of the combustion of the hydrogen mixed gas was evaluated by using the catalysts produced as described above and the catalysts produced under the altered production conditions. The catalysts added in this test were the catalysts produced by altering the platinum loading of the aforementioned catalysts and the catalysts produced by using platinum colloid as the platinum material. The loading of platinum was adjusted by the used amount of the ethanol solution of chloroplatinic acid.

In the production of catalysts based on the use of colloid, each carrier was made to support platinum colloidal particles as the catalyst metal. The supported platinum colloid was prepared as follows: 44.5 g (2.0 g as platinum) of a solution of dinitrodiammine platinum nitrate (platinum: 4.5%), 4.0 g of tetramethyl ammonium and 500 mL of ethanol were mixed in 2000 mL of water, the resulting mixture was allowed to react for 11 hours while being reduced under stirring and heating in an oil bath. The colloid solution after the reaction was filtered with a 0.2-μm membrane filter, and further concentrated with a rotary evaporator to yield a 2% platinum colloid solution.

In the support of the platinum colloid on a carrier, 100 g of the carrier was placed in a beaker containing 200 mL of ethanol, and 25 g of the aforementioned platinum colloid solution was added to the beaker to allow the platinum colloid to adsorb to the carrier. Then, the solution was placed in a rotary evaporator, the water and the ethanol were evaporated, then the carrier was placed in a column, 3% hydrogen gas (balanced with $N_2$) was made to pass through the column at 300° C. for 2 hours, and thus a catalyst was obtained. The platinum concentration of each of the thus produced catalysts was 1.0% by weight.

In the hydrogen combustion test, a moisture-containing hydrogen mixed gas (relative humidity: 95%, balanced with $N_2$) was introduced into a catalyst layer prepared by packing the catalyst (catalyst volume: 130 mL), and the decomposition efficiency was calculated by dividing the hydrogen concentration in the mixed gas before the passage through the catalyst layer by the hydrogen concentration in the mixed gas after the passage through the catalyst layer. In this test, for comparison, the combustion test of the catalysts using carriers not subjected to hydrophobization treatment was also performed. Moreover, as references, the combustion test of the catalysts using resins as the carriers was also performed. The evaluation of the performance of each of Examples was performed by taking as the decomposition efficiency the value obtained by dividing the concentration at the inlet of the catalyst layer by the concentration at the outlet of the catalyst layer. The hydrogen concentrations of the mixed gas at the inlet and outlet of the catalyst layer were measured with a gas chromatograph. From the performance of the gas chromatograph used, the effective measurement upper limit of the decomposition efficiency was 1000. The details of the test conditions are as follows:

The hydrogen concentration in the mixed gas before the passage through the catalyst layer: 10300 ppm The moisture concentration: 95% in relative humidity The temperature at the inlet of the catalyst layer: 20° C.

The catalyst amount in the catalyst layer: 100 $cm^3$

The flow rate of the mixed gas: 500, 2000 and 5000 $cm^3$ (STP)/min

TABLE 4

| | Carrier | Platinum material | Loading rate | Inorganic surface modifier | Decomposition efficiency 500 ($cm^3$/min) | 2000 ($cm^3$/min) | 5000 ($cm^3$/min) |
|---|---|---|---|---|---|---|---|
| Example 1 | $SiO_2$ | Chloroplatinic acid | 1.0 wt % | Methyltrimethoxysilane | 1000 or more | 1000 or more | 1000 or more |
| Example 2 | | | | Dimethyldimethoxysilane | 1000 or more | 1000 or more | 1000 or more |
| Comparative Example 1 | | | | None | 28.0 | 118.9 | 190.6 |
| Example 3 | $Al_2O_3$ | Chloroplatinic acid | 1.0 wt % | Methyltrimethoxysilane | 4.7 | 13.8 | 12.4 |
| Comparative Example 2 | | | | None | 2.0 | 1.1 | 1.4 |
| Example 4 | $SiO_2$ | Chloroplatinic acid | 0.5 wt % | Methyltrimethoxysilane | 226.2 | 562.5 | 1000 or more |
| Comparative Example 3 | | | | None | 25.61 | 31.66 | 51 |
| Example 5 | $SiO_2$ | Platinum colloid | 1.0 wt % | Methyltrimethoxysilane | 37.12 | 56.59 | 120 |
| Comparative Example 4 | | | | None | 1.6 | 1.1 | 1.3 |
| Reference Example 1 | Resin*[1] | Chloroplatinic acid | 1.0 wt % | — | 37.0 | 130.7 | 228.8 |
| Reference Example 2 | Resin*[2] | | | — | 91.5 | 202.4 | 127.0 |

*[1]Resin: Styrene-divinylbenzene
*[2]Resin: tert-Butylstyrene

As can be seen from the results of the aforementioned hydrogen combustion test, the catalyst subjected to the hydrophobization treatment, according to each of Examples, exhibited an excellent decomposition efficiency also for the reaction gas under the conditions saturated with water vapor. This is ascribable to the suppression of the adsorption of the water content in the gas as well as the adsorption of the produced water due to the hydrogen combustion reaction. The hydrophobization effect in each of Examples can be said comparable with the hydrophobization effects in the resin carriers of Reference Examples; however, the catalysts of Examples can be said excellent in handleability in that the catalysts of Examples are free from the adverse possibility of such damages at high temperatures as occurring in the resin carriers.

(Tritium Combustion Test)

Figure 2:
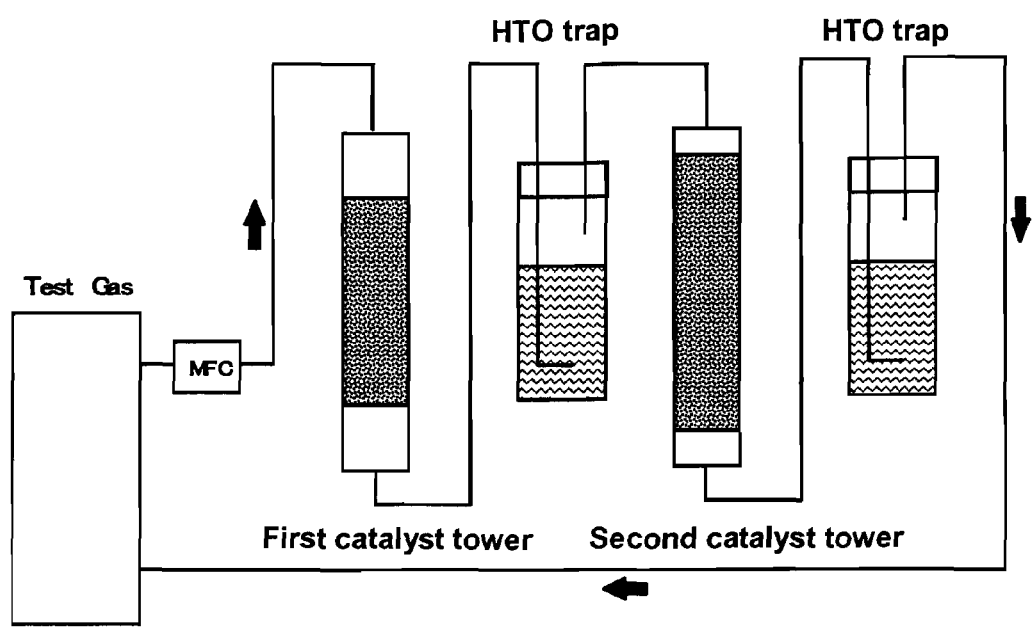
FIG. 2 shows a schematic configuration of a test apparatus for combustion test of tritium.

Next, a tritium combustion test was performed. This test was performed for Examples 1 and 2, which were satisfactory in the results of the aforementioned hydrogen combustion test, for Comparative Examples 1 and 2 and the Reference Examples 1 and 2, as the contrast examples of Examples 1 and 2. FIG. 2 illustrates a test apparatus for the tritium combustion test. In the tritium combustion test, a test gas from a test gas feeding source was made to pass through two catalyst towers; in a first catalyst tower, the catalyst of each of Examples was packed (50 cc) and in a second catalyst tower, a commercially available platinum catalyst was packed (100 cc). The water vapor produced in each of the catalyst towers was collected with a HTO (tritiated water) trap and sampled, and the tritium combustion amount was determined with a liquid scintillation counter. The evaluation of the performance of each of Examples was performed in terms of the reaction percentage (H1/(H1+H2))×100(%) wherein H1 represents the tritium combustion amount in the first tower and H2 represents the tritium combustion amount in the second tower. The details of the test conditions are as follows:

The tritium concentration in the test gas: 1000 Bq/cc (corresponding to 0.02 ppm hydrogen)

The moisture: Entrainment of saturated water vapor

The temperature of the catalyst layer: 15° C. (first tower), 250° C. (second tower)

The flow rate of the test gas: 500, 1000 and 2500 $cm^3$ (STP)/min

TABLE 5

| | Carrier | Platinum material | Loading rate | Inorganic surface modifier | Reaction percentage (%) 500 ($cm^3$/min) | 1000 ($cm^3$/min) | 2500 ($cm^3$/min) |
|---|---|---|---|---|---|---|---|
| Example 1 | $SiO_2$ | Chloroplatinic acid | 1.0 wt % | Methyltrimethoxysilane | 8.6 | 6.3 | 3.3 |
| Example 2 | | | | Dimethyldimethoxysilane | 7.7 | 5.3 | 3.3 |
| Comparative Example 1 | $SiO_2$ | Chloroplatinic acid | 1.0 wt % | None | 1.6 | 1.3 | 0.8 |
| Comparative Example 2 | $Al_2O_3$ | | | None | 0.5 | 0.7 | 0.1 |
| Reference Example 1 | Resin*[1] | Chloroplatinic acid | 1.0 wt % | — | 7.4 | 2.1 | 1.9 |
| Reference Example 2 | Resin*[2] | | | — | 5.4 | 7.0 | 3.9 |

*[1]Resin: Styrene-divinylbenzene
*[2]Resin: tert-Butylstyrene

As can be seen from the results of this tritium combustion test, the catalysts of Examples 1 and 2, subjected to the hydrophobization treatment were observed to be remarkably improved in the reaction percentage, as compared to the catalysts not subjected to the hydrophobization treatment. The catalysts of Examples 1 and 2 have the performances equal to or higher than the performances of the catalysts supported on the resin carrier of Reference Examples 1 and 2, and such performances combined with no adverse possibility of damages at high temperatures allow the catalysts of Examples 1 and 2 to be stated as extremely advantageous. The reaction percentages in this test fall within a range of several percent, and are apparently regarded as resulting in low levels of results; however, such results are inferred to be ascribable to the considerably low tritium concentration of the test gas, and to no improvement of the catalytic activity by the reaction heat because of the small reaction heat due to such low concentration of tritium. However, probably the reaction percentage can be coped with by the optimization of the operation conditions.

INDUSTRIAL APPLICABILITY

As described above, the hydrogen combustion catalyst according to the present invention suppresses the catalytic activity decrease due to the water content in the atmosphere and the produced water due to the combustion reaction. Consequently, the hydrogen combustion catalyst according to the present invention is effective, for example, in the case where the continuation of the reaction at low temperatures is demanded, and is expected to be actively used in the facilities such as high-purity hydrogen purification plants as well as nuclear fusion plants.

What is claimed is:

1. A method for combusting hydrogen, the method comprising combusting the hydrogen in a hydrogen-containing gas by making the hydrogen-containing gas pass through a hydrogen combustion catalyst comprising a catalyst metal comprised of platinum, supported on a carrier composed of an inorganic oxide, wherein the carrier includes an organic silane having at least an alkyl group having three or less carbon atoms, bonded by substitution to an end of each of a fraction or the whole of hydroxyl groups on the surface of the carrier; and the catalyst metal is supported on the carrier including the organic silane bonded thereto; wherein the hydrogen-containing gas contains a water content equal to or less than the saturated water vapor content at the reaction temperature of the hydrogen-containing gas; and the hydrogen is combusted by setting the reaction temperature at 0 to 40° C.

2. The method according to claim 1, wherein the organic silane comprises any one of trimethylmethoxysilane, trimethylethoxysilane, trimethylchlorosilane, dimethyldimethoxysilane, dimethyldiethoxysilane, dimethyldichlorosilane, methyltrimethoxysilane, methyltriethoxysilane, methyltrichlorosilane, triethylmethoxysilane, triethylethoxysilane, triethylchlorosilane, diethyldimethoxysilane, diethyldiethoxysilane, diethyldichlorosilane, ethyltrimethoxysilane, ethyltriethoxysilane, ethyltrichlorosilane, tripropylmethoxysilane, tripropylethoxysilane, tripropylchlorosilane, dipropyldimethoxysilane, dipropyldiethoxysilane, dipropyldichlorosilane, propyltrimethoxysilane, propyltriethoxysilane and propyltrichlorosilane.

3. The method according to claim 1, wherein the inorganic oxide comprises any one of alumina, silica, silica-alumina, zeolite and zirconia.

* * * * *